United States Patent Office 3,063,788
Patented Nov. 13, 1962

3,063,788
TREATMENT FOR GLASS BODIES
Folsom Munro Veazie, Granville, Ohio, assignor to Owens-Corning Fiberglas Corporation, a corporation of Delaware
No Drawing. Filed Aug. 11, 1960, Ser. No. 48,818
5 Claims. (Cl. 18—54)

This invention relates to methods and materials for treating glass structures and particularly to treating methods and materials which facilitate the melting of glass structures employed as base materials in the fabrication of glass fibers.

The conduct of the invention is illustrated by the following flow diagram.

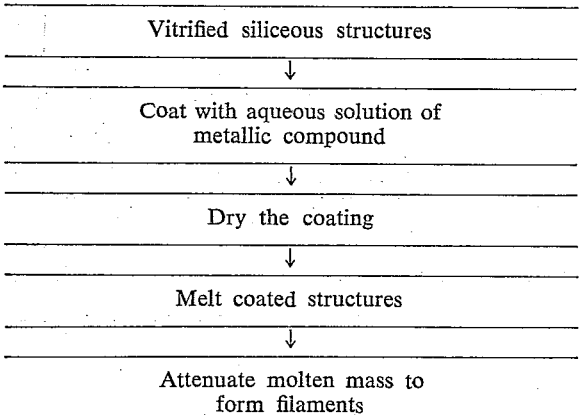

Glass structures such as marbles, cullet, beads and the like have gained widespread acceptance as base materials for the production of fibrous glass due to the homogeneity of glass composition, handleability, storage characteristics and controlled uniformity achieved with such structures as opposed to the utilization of batch compositions wherein fibers are drawn from a molten mass obtained by vitrifying glass batch materials such as silica, soda ash and lime. A spherical structure termed a marble and having the general shape and size of the marbles employed in children games, has gained particular popularity as a base material in fiberizing due to its uniform structural and melting characteristics and suitability for storage and feeding to the melting apparatus.

In preparing glass fibers, the glass structures which provide the base material are fed into a heated bushing which is provided with orifices, and are transformed into a molten state whereby the molten glass may be continuously flowed through the orifices and attenuated into continuous vitreous filaments or fibers. The fibers thus formed are immediately wound upon apparatus positioned adjacent to the fiber forming bushing, to provide a wound package.

However, the utilization of glass structures as the base materials which are rendered molten and attenuated into fibers is attended by the formation of "stones" and "seeds." Stones are crystals entrained within the otherwise amorphous glass while seeds are small bubbles which may stem from gases given off when stones or crystals are dissolved in the amorphous glass.

Such persistent formation of stones and seeds has raised a serious hindrance to the utilization of glass structures as base materials in fiberizing processes since their presence results in the plugging of the orifices of the fiber forming bushing and in the frequent breaking of the fibers during attenuation. These processing detriments occur despite the small size of the stones and seeds, due to the fact that the diameters of both the fibers and the bushing orifices range in the area of .0002 to .008 inch.

While the production stoppage and necessity for refurbishing which result from the plugging of bushing orifices by stones and seeds are major processing detriments, the problem of fiber breakage has much graver implications. It has been observed that fiber breaks occurring during attenuation normally occur at areas which contain an entrained stone or seed and a resultant heterogeneous and weakened region. The magnitude of this problem is aptly demonstrated by the fact that in the formation of wound packages of fibrous glass strand only 4 to 60% of the packages begun are completed, as a result of fiber breaks. A tremendous amount of waste is thus reflected in the discarding of the product, since the packages are discarded if the interruption occurs within two minutes from the commencement of winding. In any event, a production loss is entailed by such interruptions.

The higher attrition rate of only 4% completion, with an average completion rate of 15 to 20% of the packages begun, occurs with high thru-put bushings wherein fibers are drawn at a fast rate. The high incidence of breaking occurring during rapid attenuation is apparently the result of the relatively short residence time of the marbles or glass structures in the bushing, since this time averages one-half hour or less in such bushings as compared to six hours in slower fiber forming bushings. While an obvious solution to such a problem appears to be the advancement of bushing temperatures or the provision of larger bushings with an attendant increase in the residence time of the marbles in the bushing, these remedies are not economically feasible. Bushing temperatures are restricted by the temperature limitations of the materials employed in the fabrication of the bushing. Due to the high temperatures and abrasive or erosive characteristics of the molten glass, a highly specialized material containing costly substances such as platinum are employed. The costliness of such materials is also a drawback in the preparation of larger bushings with a corresponding increase in melt residency, as well as the fact that enlarged bushings create larger floor space and heating requirements.

At any rate, it is apparent that the formation of stones and seeds poses a current problem which results in large losses in the nature of product waste, processing delay, work stoppage and bushing refurbishing for which a solution has not been provided.

It is an object of this invention to provide a method for the diminution or deletion of harmful stone and seed formation in the preparation of glass fibers from a molten mass obtained by melting glass structures.

A further object is the provision of surface treating or fluxing materials for the surfaces of glass structures employed in the fabrication of glass fibers.

Another object is the provision of treated glass structures possessing enhanced devitrification characteristics and higher production values in the preparation of glass fibers.

The aforegoing objects are achieved by the present invention by applying a thin coating of a fluxing material comprising a group I metal, group II metal or a combination thereof or a soluble salt of a metal from group I or group II of the periodic chart of the elements or a combination of salts of group I and group II metals to the surfaces of glass structures prior to their reduction to a molten state.

The group I metals such as lithium, sodium, potassium, rubidium, cesium, francium, copper, silver or gold, and the group II metals such as calcium, barium, magnesium, strontium, zinc, cadmium, mercury, beryllium and radium, or combinations of the two are useful in the conduct of the invention.

When a metal or an insoluble metallic compound is employed, it may be applied in the form of a suspension or may be entrained in a film forming material or adhesive such as a resin, starch or gelatin. However, soluble, and particularly water-soluble metallic compounds such as metallic salts, hydroxides or oxides are preferred because of the ease and economy of application which is attained when the metallic compound is dispersed in water or a solvent and applied to the glass structure. The coating may then be dried to provide a relatively durable and uniform coating of the metallic compound upon the glass structure.

By means of the methods and materials of the invention, the melting of the treated glass structures and the conduct of the fiber forming operation is greatly improved due to the diminution or substantial deletion of stone and seed formation. As a result, both fiber breaks and bushing build-up or clogging are greatly diminished with attendant time, processing and product improvements.

While the theory or theories underlying the efficacy of the methods and materials of the invention, wherein a fluxing material is applied to the surface of the glass structure, have not been completely developed, a number of highly plausible propositions are advanced.

In one theory, surface devitrification is purported to comprise the culpable factor in the instigation of stone and seed formation. In this regard, it is believed that devitrification or crystal formation at the surface of the glass structure results in the formation of a heterogeneous structure having a crystal containing surface and amorphous core or central portion. This defect may be increased by the presence of surface devitrification upon the surface of the structure prior to heating and the tendency of such crystals to enhance further crystal formation as the structure passes through the devitrification temperature range, prior to attaining liquidus temperature. The effect may be further amplified by the tendency among glasses, with rare exceptions such as the opal glasses, to experience the onset of devitrification or crystallization at the surface of the structure. Presumably, carrying the treating temperature beyond the devitrification range and to the point of liquidus should result in the resolution of crystals formed during devitrification. However, the apparent validity of this premise is somewhat changed when one considers the treatment of a heterogeneous structure. In such case, the physical characteristics of the devitrified or crystalline surface of the structure, which differ from the characteristics of the amorphous core of the structure may result in a condition wherein the amorphous material of the core or central portion attains liquidus prior to the devitrified surface and the latter fails to attain liquidus throughout the course of the heat treatment. Accordingly, deleterious substances of a crystalline nature are entrained in the amorphous molten glass either in the form of crystalline stones or as bubbles or seeds produced by gases evolved by the stones. It is also suspected that the troublesome stones comprise diopside wollastonite, trydimite and cristobalite with trydimite and cristobalite acting as the worst offenders due to the fact that diopside contains natural fluxing materials which facilitate its resolution. In such case, the materials and methods of the invention provide a fluxing material at the structure surface which facilitates the resolution of crystals present in this region.

A second theory postulates that surface inhomogeneity is caused by the volatilization and passing off of natural fluxing materials normally occurring at the surface of the structure. This results in a disproportionate ratio of refractory to fluxing materials in this area and a resultant retardation or slowing down of the resolution of the refractory materials. In this instance, the fluxing materials of the invention serve to restore the flux to refractory balance at the surface of the glass structure.

In either instance, the resolution of crystalline materials is appreciably enhanced through the application of fluxing materials to the surface of the glass structure.

According to the invention, a relatively small amount of a fluxing material is applied to the surface of the glass structure and preferably dried prior to the utilization of the structures in the formation of glass fibers.

The fluxing materials which have been found particularly efficient in improving fiber forming bushing performance are the soluble salts of the metals of group I and group II of the periodic arrangement of the elements and combinations of salts of the metals of these two groups. Particularly useful are salts of barium, potassium, sodium and calcium and especially the nitrates of these metals. However, the other soluble salts of group I and II metals, such as the nitrates, acetates, carbonates, sulfates and halides of calcium, magnesium, barium, sodium, potassium, lithium, etc., are also applicable.

These materials are employed in the form of solutions for ease of application, with the solution normally containing at least .03% by weight of the particular salt utilized. This concentration may vary according to the improvement in performance which is obtained with a specific salt and in relation to the amount of the solution which is applied to the surface of the structure treated in accordance with the application technique which is employed.

The apparatus utilized in applying the treating material to the surfaces of the glass structure may comprise any conventional contact, immersion or spray technique. A simple immersion technique wherein the glass structures are submerged in a bath of the selected treating material which is maintained at a temperature of approximately 160° F., for a thirty second interval has produced excellent results.

In addition, contact and spray methods in which the glass structures pass into contact with an applicator member such as a porous pad or through the path of a spray or mist have also been successful. A specific example of such a treating method comprises flowing or trickling the treating solution down an inclined plane or chute and concurrently rolling the mables or glass structures down the solution covered chute surface, whereby the solution is transferred to the surface of the marbles. Alternatively, contact applicators, such as the wick or pad type may be positioned upon or above the surface of the previously described inclined chute or a horizontal conveyor upon which the marbles are conveyed. Similarly, spray or jet apparatus may be positioned upon or adjacent to such inclined or horizontal conveyors. These applications are then followed by a drying step which may be achieved either through standing at room temperature or by means of applied heat such as oven heating or exposure to a burner flame. Such drying is conducted merely to prevent or retard the loss of the coating through transfer by contact with other treated structures or supporting surfaces and the like.

As a result of the application and drying, the glass structures are provided with a dried, very thin coating of the treating material or salt. While the extent of this coating is difficult to determine and varies somewhat according to the application method employed, it generally ranges between .0003 and .01 inch in thickness and comprises between .0001 and .5% by weight of the treated structure.

In a preferred embodiment, the heating solution is maintained during treatment at a temperature in excess of 100° F. and preferably between 145° F. and 175° F. In addition, the marbles are preferably heated to a temperature of 120–200° F. prior to their introduction to the treating material. However, these techniques are in the nature of process refinements and are not essential to the conduct of the invention.

While the methods and materials of the invention are described primarily in relationship to roughly spherical structures or marbles, it must be realized that they are broadly applicable to any preformed glass structure which is melted and employed as a molten source for fiber formation. For example, glass cullet may be similarly treated to enhance its revitrification properties and utilized as a base material or composition for fiber formation. Similarly, glass plates, tubes, rods and the like are also susceptible to the treatment. In addition, glass structures employed in other fiber forming techniques which do not employ a fiber forming bushing may also be treated according to the invention. For example, in that method wherein glass rods are rendered molten and fibers are drawn therefrom, a corresponding improvement may be attained by pretreating the rods with the methods and materials of the invention.

Methods and materials which may be utilized in the conduct of the invention are set forth in the following examples:

Example 1

A barium nitrate treating material was prepared by dissolving 0.8% by weight of barium nitrate in water. The pH of the solution was then adjusted to 2–3 by means of the addition of nitric acid.

Example 2

A calcium nitrate solution was prepared by dissolving 0.6% by weight of calcium nitrate in water and adjusting the pH of the solution to 2–3 through the addition of nitric acid.

Example 3

A calcium acetate solution was prepared by dissolving 0.8% by weight of calcium acetate in water and adjusting the pH of the solution to 2–3 by adding acetic acid.

Example 4

A potassium nitrate treating composition was prepared by dissolving 0.8% by weight of potassium nitrate in water and adjusting the pH of the resulting solution to 2–3 by means of the addition of nitric acid.

Example 5

A solution of sodium nitrate was prepared by dissolving 0.25% by weight of sodium nitrate in water and adjusting the pH of the solution to 2–3 through the addition of nitric acid.

Example 6

A solution of calcium nitrate and sodium nitrate was prepared by dissolving 0.8% by weight of calcium nitrate and .25% by weight of sodium nitrate in water and adjusting the pH of the solution to 2–3 by means of the addition of nitric acid.

Example 7

A solution of potassium nitrate and barium nitrate was prepared by dissolving 0.7% by weight of potassium nitrate and 0.5% by weight of barium nitrate in water and adjusting the pH to 2–3.5 by adding nitric acid.

Example 8

A treating composition was prepared by dissolving 0.7% by weight of barium hydroxide in water. The pH of the resulting solution was found to be 12.4.

Example 9

A treating composition was prepared by dissolving 0.18% by weight of calcium hydroxide in water. The resulting solution had a pH of 12.0.

Example 10

A treating composition with a pH of 12.3 was prepared by dissolving .5% by weight of sodium hydroxide in water.

The treating materials or solutions of Examples 1 through 10 were then employed in treating or coating glass marbles formed from an E glass composition and utilized in the subsequently described operating efficiency or "call down" rate determinations.

The materials of Examples 3 through 6 and 8 through 10 were employed in a simple immersion technique wherein the glass marbles were immersed in the treating compositions for a period of 30 seconds and subjected to drying, while the materials of Examples 1, 2 and 7 were treated according to the previously described "trickle plate" technique wherein the treating composition is trickled or flowed down an inclined chute while the marbles are concurrently rolled down the same chute and then dried.

The preferred method of the invention wherein the treating solution is maintained at a temperature of 160° F. and the marbles are preheated to 120–200° F. was also employed. The process may be facilitated by bringing the treating compositions to the elevated temperature during the preparation of the salt solutions, since in this fashion the metal salts may be more readily dissolved.

The thus treated marbles were then utilized in the formation of glass filaments or fibers by previously described conventional fiber forming methods in order to ascertain the fiber forming efficiency or "call down" rate data which is described hereafter.

The improvement achieved by means of the methods and materials of the present invention is aptly demonstated by the figures on "call down" rate which have been derived and are set forth in the table below. "Call down" rates are indicia of production efficiency and are obtained by dividing the total interruptions, both voluntary and involuntary, which are experienced during a three hour period, into the number of voluntary interruptions occasioned by the tube running its full allotted course to completion and thereby requiring the commencement of a new tube.

The data embodied in the table illustrates the call down rates achieved during three hour runs with glass marbles treated with each of the treating materials of Examples 1 through 10, and the call down rates derived for comparison represent three hour runs with untreated glass marbles on the same fiber forming bushing, immediately prior to the utilization of the treated marbles. It must be noted that the call down figures do not represent the total improvement achieved by the present invention since fiber breaks occurring from causes other than those combatted by the invention are still embodied in the figures representing the call down percentage for the treated marbles. Thus, it is possible that a complete solution of the specified problem is achieved and that the failure to obtain a 100% call down rate is precluded only because of the incidence of fiber breaks occasioned by factors other than the specified type of seed and stone inspired breaks. For example, breaks caused by the formation of zircon beads are commonly encountered. The difficulty of attaining a 100% call down rate is aptly demonstrated by the fact that the completion of one wound package normally requires a 15 minute winding cycle with the optimum processing of four packages per hour. Accordingly, the occurrence of one fiber break results in a call down rate decrease of 20% for that hour, which must be redeemed by, and is reflected in preceding or succeeding operating hours.

The data obtained by the aforedescribed production runs is set forth in the following table:

Call Down Rate (Percent)

| Treating Material | Untreated Marbles, percent | Treated Marbles, percent |
|---|---|---|
| Example 1 | 21 | 65 |
| Example 2 | 20 | 70 |
| Example 3 | 28 | 65 |
| Example 4 | 32 | 76 |
| Example 5 | 33 | 55 |
| Example 6 | 30 | 61 |
| Example 7 | 35 | 63 |
| Example 8 | 20 | 42 |
| Example 9 | 15 | 39 |
| Example 10 | 37 | 58 |

On the basis of the above data, it may be readily observed that the call down rate is increased from 57 to 250% through the use of the methods and materials of the present invention with an attendant increase in production and a decrease in waste or scrapped product and in operating costs.

It should be noted that a narrower and generally lower range of improvement is achieved with the alkaline treating compositions of Examples 8 through 10, which have pH values between 8.5 and 13. However, a significant improvement in call down rates which ranges between 57 and 160% was achieved with these materials.

As previously stated, the methods and materials of the invention are not limited to use with glass marbles alone but may be employed with any glass fiber forming technique wherein a vitrified material is rendered molten and formed into glass filaments or fibers or in the treatment of mineral compositions or structures.

It is apparent that novel treating compositions, methods and superior performing glass structures for use in fiber forming processes have been provided by the present invention.

It is also obvious that various changes, substitutions and alterations may be made in the treating materials, methods and products of the invention, without departing from the spirit of the invention as is defined by the following claims.

I claim:

1. In a method for producing glass filaments which includes the steps of transforming vitrified siliceous structures to a molten state and attenuating the molten mass to form filaments therefrom, the improvement comprising coating said vitrified siliceous structures prior to transforming said structures to a molten state, with a salt selected from the group consisting of the nitrates and acetates of barium, calcium, potassium, sodium, magnesium and lithium, and the hydroxides of barium, and calcium.

2. A method as described in claim 1 in which said coating is applied in the form of an aqueous solution.

3. A method as described in claim 1, in which said coating is a mixture of at least two of said salts.

4. A method as described in claim 1, in which said salt is barium nitrate.

5. A method as described in claim 1, in which said coating is a mixture of potassium nitrate and barium nitrate.

References Cited in the file of this patent

UNITED STATES PATENTS

| 2,354,350 | Schuetz | July 25, 1944 |
| 2,482,071 | Simison | Sept. 13, 1949 |
| 2,578,110 | Tooley | Dec. 11, 1951 |
| 2,635,389 | Toulmin | Apr. 21, 1953 |
| 2,699,415 | Nachtman | Jan. 11, 1955 |
| 2,833,673 | Hart et al. | May 6, 1958 |
| 2,860,450 | Case | Nov. 18, 1958 |